US012734767B2

(12) United States Patent
Mori

(10) Patent No.: US 12,734,767 B2
(45) Date of Patent: Sep. 15, 2026

(54) FIBER STRUCTURE AND FIBER-REINFORCED COMPOSITE MATERIAL

(71) Applicant: KABUSHIKI KAISHA TOYOTA JIDOSHOKKI, Kariya (JP)

(72) Inventor: Kohei Mori, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 375 days.

(21) Appl. No.: 18/602,644

(22) Filed: Mar. 12, 2024

(65) Prior Publication Data

US 2024/0316880 A1 Sep. 26, 2024

(30) Foreign Application Priority Data

Mar. 20, 2023 (JP) ................................ 2023-044577

(51) Int. Cl.

| | |
|---|---|
| ***B29C 70/20*** | (2006.01) |
| ***B29C 70/52*** | (2006.01) |
| ***C08J 5/24*** | (2006.01) |
| ***D02G 3/36*** | (2006.01) |
| ***D02G 3/38*** | (2006.01) |

(52) U.S. Cl.

CPC ................ *B29C 70/20* (2013.01); *C08J 5/24* (2013.01); *D02G 3/36* (2013.01); *D02G 3/38* (2013.01); *B29C 70/52* (2013.01); *D10B 2505/02* (2013.01)

(58) Field of Classification Search

CPC ....... B29C 70/081; B29C 70/14; B29C 70/20; B29C 70/228; B29C 70/24; B29C 70/48; B29C 70/52; B29C 70/543; B29C 70/546; B29K 2105/26; D02G 3/38; D02G 3/36; D10B 2505/02; D03D 15/283; D03D 15/47; D03D 15/50

See application file for complete search history.

(56) References Cited

U.S. PATENT DOCUMENTS 10,697,094 B2 * 6/2020 Kamiya .................. D02G 3/38
2013/0192189 A1 8/2013 Lawrence et al.

FOREIGN PATENT DOCUMENTS

JP 2013-519000 A 5/2013

* cited by examiner

*Primary Examiner* — Arti Singh-Pandey
(74) *Attorney, Agent, or Firm* — Sughrue Mion, PLLC

(57) ABSTRACT

A fiber structure serves as a reinforcement of a fiber-reinforced composite material that includes matrix resin as a matrix. The fiber structure includes a plurality of first reinforcing fiber yarns and a second reinforcing fiber yarn. The first reinforcing fiber yarns is each formed of a bundle of fibers including discontinuous fibers made of reinforcing fibers. The bundle of fibers is wrapped with a covering yarn. The second reinforcing fiber yarn is formed of a bunch of continuous fibers made of reinforcing fibers. The fiber structure includes a fiber body formed of the first reinforcing fiber yarns and the second reinforcing fiber yarn arranged alongside and extending in the same direction. The fiber body has a portion in which the second reinforcing fiber yarn is held between and by the first reinforcing fiber yarns.

4 Claims, 3 Drawing Sheets

FIBER STRUCTURE AND FIBER-REINFORCED COMPOSITE MATERIAL

CROSS-REFERENCE TO RELATED APPLICATION

This application claims priority to Japanese Patent Application No. 2023-044577 filed on Mar. 20, 2023, the entire disclosure of which is incorporated herein by reference.

The present disclosure relates to a fiber structure and a fiber-reinforced composite material.

BACKGROUND ART

A fiber-reinforced composite material is formed of matrix resin as a matrix and a fiber structure as a reinforcement. The fiber structure includes reinforcing fiber yarns, which are preferably non-twisted. The non-twisted reinforcing fiber yarns are easily arranged in the same fiber orientation, which can suppress a decrease in the strength of the fiber-reinforced composite material. Examples of the reinforcing fibers forming the non-twisted reinforcing fiber yarns include regenerated carbon fibers of spun yarns disclosed in Japanese Patent Application Publication No. 2013-519000. The regenerated carbon fibers disclosed in Japanese Patent Application Publication No. 2013-519000 are discontinuous fibers that extend linearly.

The reinforcing fiber yarns formed of the linearly extending discontinuous fibers need to be maintained in bundle form by a covering yarn wrapping around the bundle of the discontinuous fibers. The fiber structure, which includes the reinforcing fiber yarns with the covering yarn, serves as a reinforcement, the reinforcement is likely to have a gap between the reinforcing fibers. Accordingly, the fiber-reinforced composite material is likely to have a resin-rich portion between the reinforcing fiber yarns, where only matrix resin is filled.

The present disclosure, which has been made in light of the above-mentioned problem, is directed to providing a fiber structure and a fiber-reinforced composite material that suppress the generation of a resin-rich portion.

SUMMARY

In accordance with an aspect of the present disclosure, there is provided a fiber structure serving as a reinforcement of a fiber-reinforced composite material that includes matrix resin as a matrix. The fiber structure includes a plurality of first reinforcing fiber yarns and a second reinforcing fiber yarn. The first reinforcing fiber yarns is each formed of a bundle of fibers including discontinuous fibers made of reinforcing fibers. The bundle of fibers is wrapped with a covering yarn. The second reinforcing fiber yarn is formed of a bunch of continuous fibers made of reinforcing fibers. The fiber structure includes a fiber body formed of the first reinforcing fiber yarns and the second reinforcing fiber yarn arranged alongside and extending in the same direction. The fiber body has a portion in which the second reinforcing fiber yarn is held between and by the first reinforcing fiber yarns.

In accordance with another aspect of the present disclosure, there is provided a fiber-reinforced composite material. The fiber-reinforced composite material includes matrix resin as a matrix; and a fiber structure as a reinforcement. The fiber structure includes: a plurality of first reinforcing fiber yarns; a second reinforcing fiber yarn; and a fiber body. The first reinforcing fiber yarns is each formed of a bundle of fibers including discontinuous fibers made of reinforcing fibers. The bundle of fibers is wrapped with a covering yarn. The second reinforcing fiber yarn is formed of a bunch of continuous fibers made of reinforcing fibers. The fiber body is formed of the first reinforcing fiber yarns and the second reinforcing fiber yarn arranged alongside and extending in the same direction. The fiber body has a portion in which the second reinforcing fiber yarn is held between and by the first reinforcing fiber yarns. The continuous fibers are dispersed in the matrix resin filled in a gap between the first reinforcing fiber yarns.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the embodiments together with the accompanying drawings in which.

DETAILED DESCRIPTION OF THE EMBODIMENTS

First Embodiment

Figure 1:
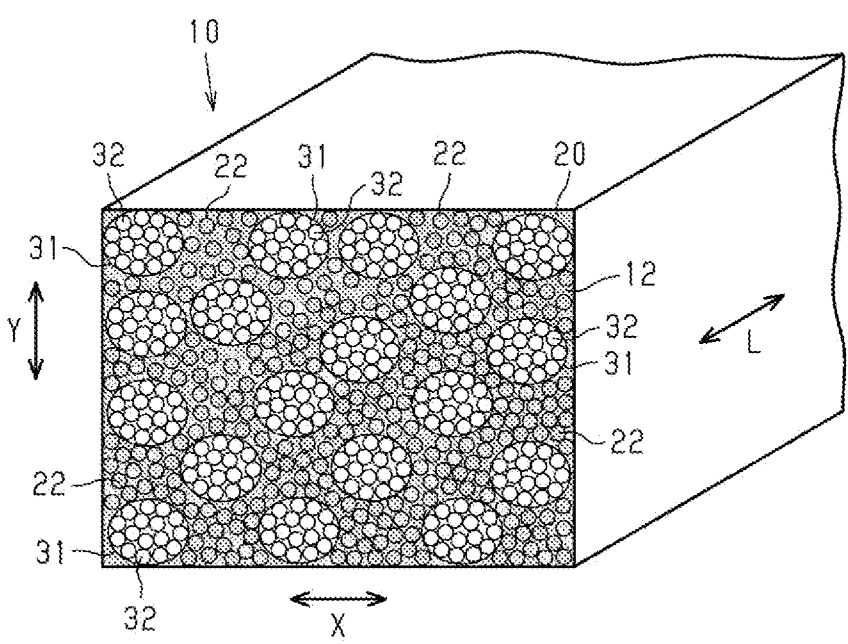
FIG. 1 is a schematic cross-sectional view of a fiber-reinforced composite material according to a first embodiment.
Figure 2:
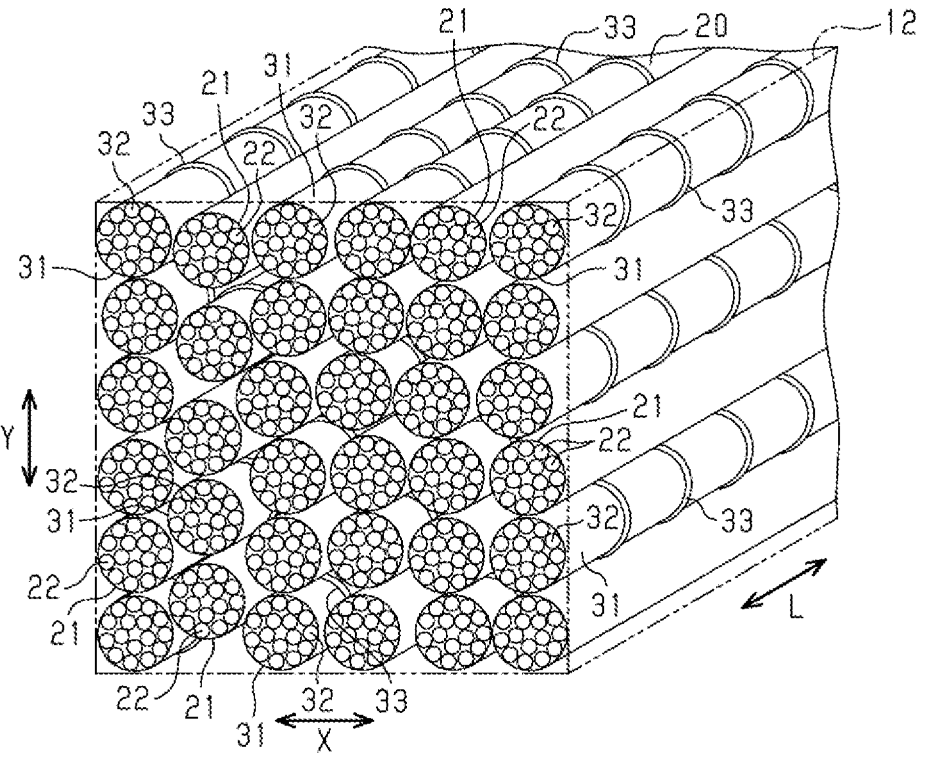
FIG. 2 is a schematic cross-sectional view of a fiber structure according to the first embodiment.
Figure 3:
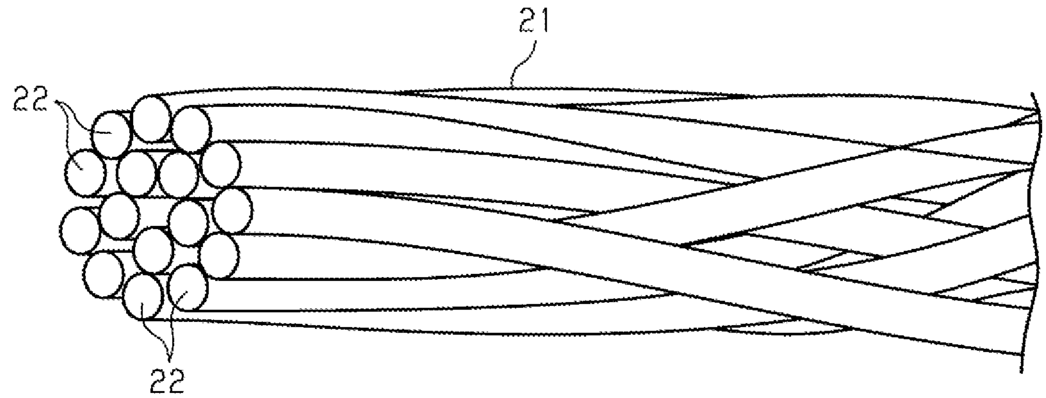
FIG. 3 is a schematic view of a second reinforcing fiber yarn.
Figure 4:
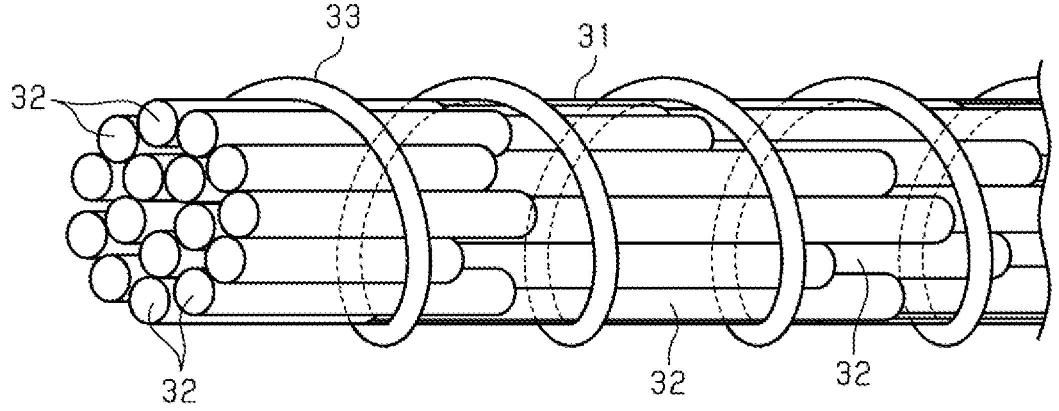
FIG. 4 is a schematic view of a first reinforcing fiber yarn.

The following will describe a fiber structure and a fiber-reinforced composite material according to a first embodiment with reference to accompanying FIGS. 1 to 5. FIG. 1 schematically illustrates a fiber-reinforced composite material 10 and a fiber structure 20. FIG. 2 schematically illustrates the fiber structure 20. FIG. 3 schematically illustrates a second reinforcing fiber yarn 21. FIG. 4 schematically illustrates a first reinforcing fiber yarn 31.

Fiber-Reinforced Composite Material

As illustrated in FIG. 1, the fiber-reinforced composite material 10 includes matrix resin 12 as a matrix and a fiber structure 20 as a reinforcement. FIG. 1 schematically illustrates the fiber-reinforced composite material 10 and the matrix resin 12 hatched without a detailed illustration of the outlines of the fiber-reinforced composite material 10 and the fiber structure 20.

The fiber-reinforced composite material 10 is a square-column prepreg. The fiber structure 20 and the fiber-reinforced composite material 10 may have a shape, such an H-shaped columnar cross section, a U-shaped columnar cross section, or a tubular-shaped cross section. According to the present embodiment, the matrix resin 12 is epoxy resin, which is thermosetting resin. However, the matrix resin 12 does not have to be epoxy resin, and may be thermosetting resin, such as vinylester resin, unsaturated polyester resin, or phenolic resin, or thermoplastic resin, such as polyamide, polybutylene terephthalate, polycarbonate, polyethylene, polypropylene, polyimide resin, or acrylonitrile-butadiene-styrene (ABS) resin.

Fiber Structure

As illustrated in FIG. 2, the fiber structure 20 includes a plurality of first reinforcing fiber yarns 31 and a plurality of second reinforcing fiber yarns 21. FIGS. 1 and 2 schematically illustrate the fiber structure 20 without a detailed illustration of the first reinforcing fiber yarns 31 and the second reinforcing fiber yarns 21. The fiber structure 20 is a unidirectional fabric. The fiber structure 20 is formed of the first reinforcing fiber yarns 31 and the second reinforcing fiber yarns 21 arranged alongside so that the first reinforcing fiber yarns 31 and the second reinforcing fiber yarns 21 extend in the same direction. The fiber structure 20 includes a fiber body formed of the first reinforcing fiber yarns 31 and the second reinforcing fiber yarns 21 arranged alongside so that the first reinforcing fiber yarns 31 and the second reinforcing fiber yarns 21 extend in the same direction. According to the present embodiment, the whole fiber structure 20 serves as the fiber body.

As illustrated in FIG. 3, each of the second reinforcing fiber yarns 21 is formed of the bunched continuous fibers 22 made of reinforcing fibers. The continuous fibers 22 extend linearly and have rectilinearity. The continuous fibers 22 are filaments. The continuous fibers 22 extend linearly and have rectilinearity, but are partially gently curved for a productional reason. That is, the continuous fibers 22 have rectilinearity, but have a slightly curved or twisted portion.

Since the second reinforcing fiber yarn 21 is formed of a bunch of the linearly extending continuous fibers 22, the bunch of the continuous fibers 22 is slightly twisted to be maintained in yarn form. The continuous fibers 22 may be formed of organic or inorganic fibers, or mixed fibers formed of different types of organic fibers, different types of inorganic fibers, or a mix of organic and inorganic fibers. Examples of the organic fibers include acrylic fibers, nylon fibers, polyester fibers, aramid fibers, poly-p-phenylenebenzobisoxazole fibers, and ultra-high molecular weight polyethylene fibers. Examples of the inorganic fibers include carbon fibers, glass fibers, and ceramic fibers. According to the present embodiment, the continuous fibers 22 are filaments of inorganic carbon fibers.

As illustrated in FIG. 4, each of the first reinforcing fiber yarns 31 is formed of a bundle of fibers including the discontinuous fibers 32 made of reinforcing fibers, and the fiber bundle including the discontinuous fibers 32 is helically wrapped with a covering yarn 33. The covering yarn 33 maintains the bundled discontinuous fibers 32 in yarn form.

The discontinuous fibers 32 are staple fibers. The discontinuous fibers 32 are formed of cut filaments. The discontinuous fibers 32 are shorter than the continuous fibers 22 of the second reinforcing fiber yarn 21. The discontinuous fibers 32 may be formed of organic or inorganic fibers, or mixed fibers formed of different types of organic fibers, different types of inorganic fibers, or a mix of organic and inorganic fibers. Examples of the organic fibers include acrylic fibers, nylon fibers, polyester fibers, aramid fibers, poly-p-phenylenebenzobisoxazole fibers, and ultra-high molecular weight polyethylene fibers. Examples of the inorganic fibers include carbon fibers, glass fibers, and ceramic fibers.

According to the present embodiment, the discontinuous fibers 32 are made of regenerated carbon fibers as regenerated fibers. The discontinuous fibers 32 are fibers, such as tow or thrum produced when multiaxial fabrics or woven fabric are trimmed. The discontinuous fibers 32 extend linearly and have rectilinearity. The discontinuous fibers 32 are untwisted. The first reinforcing fiber yarn 31 maintained in yarn form by the covering yarn 33 has an approximate circular cross section. The first reinforcing fiber yarn 31 is formed of the discontinuous fibers 32 arranged in the same fiber orientation.

The covering yarn 33 is made of organic fibers. The organic fibers as the material of the covering yarn 33 should have a melting point at which the covering yarn 33 does not melt when the fiber structure 20 is heated during the manufacture of the fiber-reinforced composite material 10.

As illustrated in FIG. 2, an axial direction L of the fiber structure 20 corresponds to the extending direction of the first reinforcing fiber yarns 31 and the second reinforcing fiber yarns 21 in the unidirectional fabric. Accordingly, the continuous fibers 22 of the second reinforcing fiber yarns 21 and the discontinuous fibers 32 of the first reinforcing fiber yarns 31 extend linearly in the axial direction L of the fiber structure 20, and have rectilinearity. The fiber structure 20 has a rectangular cross section that is perpendicular to the axial direction L. In cross section, the fiber structure 20 is a quadrilateral with two pairs of parallel sides. One of the pairs of parallel sides extends in a first direction X, and the other of the pairs of parallel sides extends in a second direction Y. The first direction X is perpendicular to the second direction Y. The first direction X and the second direction Y are perpendicular to the axial direction L.

The ratio of the first reinforcing fiber yarns 31 and the second reinforcing fiber yarns 21 per unit area of the fiber structure 20 is determined arbitrary. If the fiber structure 20 serving as the reinforcement needs more strength in the axial direction L, the first reinforcing fiber yarns 31 need to be larger than the second reinforcing fiber yarns 21 in the ratio of the first reinforcing fiber yarns 31 to the second reinforcing fiber yarns 21 per unit area. The discontinuous fibers 32 of the first reinforcing fiber yarns 31 are regenerated carbon fibers. From the standpoint of utilization of regenerated carbon fibers, it is desirable that the first reinforcing fiber yarns 31 are larger than the second reinforcing fiber yarns 21 in the ratio of the first reinforcing fiber yarns 31 to the second reinforcing fiber yarns 21 per unit area.

In the fiber structure 20, the first reinforcing fiber yarns 31 and the second reinforcing fiber yarns 21 are randomly arranged in the first direction X and the second direction Y. The first reinforcing fiber yarns 31 and the second reinforcing fiber yarns 21 may be arranged alternately in the first direction X and the second direction Y. In the fiber structure 20, the second reinforcing fiber yarns 21 are adjacent to the first reinforcing fiber yarns 31 in another direction other than the first direction X and the second direction Y. The fiber structure 20, which serves as the fiber body, has a plurality of portions in which a single second reinforcing fiber yarn 21 is held between and by two first reinforcing fiber yarns 31 in the first direction X, in the second direction Y, or in another direction. That is, the second reinforcing fiber yarns 21 are held between and by the first reinforcing fiber yarns 31 from various directions in the fiber structure 20. The fiber structure 20 is the reinforcement formed of a prepreg impregnated with the matrix resin 12. Accordingly, the fiber-reinforced composite material 10 is a prepreg.

Method for Manufacturing Fiber Structure

Figure 5:
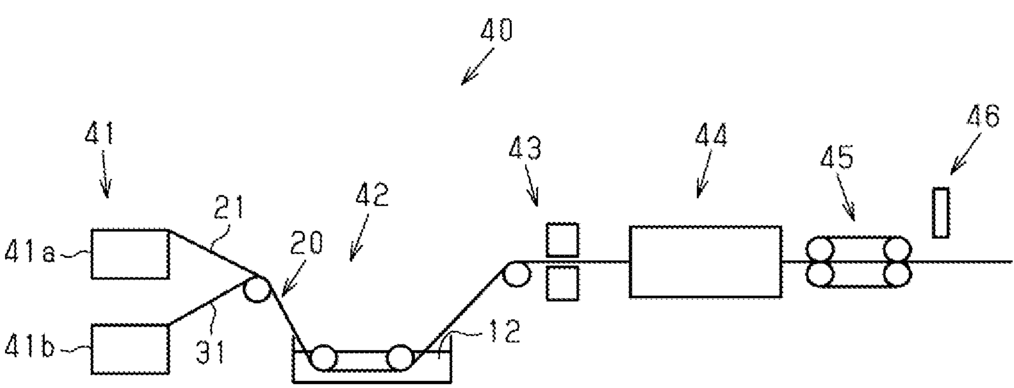
FIG. 5 is a schematic view of pultrusion molding equipment.

As illustrated in FIG. 5, the fiber-reinforced composite material 10 is produced by pultrusion molding equipment 40. The fiber structure 20 is produced in the manufacturing process of the fiber-reinforced composite material 10.

The pultrusion molding equipment 40 includes a feeding device 41, an impregnation bath 42, a press 43, a heating die 44, a puller 45, and a cutter 46. The feeding device 41 includes a feeder 41*a* for feeding the second reinforcing fiber yarns 21 and a feeder 41*b* for feeding the first reinforcing fiber yarns 31. The feeding device 41 feeds the first reinforcing fiber yarns 31 and the second reinforcing fiber yarns 21 in the same direction to produce the fiber structure 20. The first reinforcing fiber yarns 31 and the second reinforcing fiber yarns 21 are pulled by the puller 45. The first reinforcing fiber yarns 31 and the second reinforcing fiber yarns 21 are pulled by the puller 45, so that the first reinforcing fiber yarns 31 and the second reinforcing fiber yarns 21 are fed from the feeding device 41.

When the first reinforcing fiber yarns 31 and the second reinforcing fiber yarns 21 are fed from the feeding device 41, the first reinforcing fiber yarns 31 and the second reinforcing fiber yarns 21 are randomly arranged in the first direction X and the second direction Y. When the first reinforcing fiber yarns 31 and the second reinforcing fiber yarns 21 are fed from the feeding device 41, the first reinforcing fiber yarns 31 and the second reinforcing fiber yarns 21 may be alternately arranged in the first direction X and the second direction Y. Even when the first reinforcing fiber yarns 31 and the second reinforcing fiber yarns 21 are alternately arranged in the first direction X and the second direction Y and fed, the first reinforcing fiber yarns 31 and the second reinforcing fiber yarns 21 are mixed so as to be randomly arranged before reaching the impregnation bath 42.

The first reinforcing fiber yarns 31 and the second reinforcing fiber yarns 21 fed from the feeding device 41 are bunched together. That is, the first reinforcing fiber yarns 31 and the second reinforcing fiber yarns 21 are fed by the feeding device 41 such that the first reinforcing fiber yarns 31 and the second reinforcing fiber yarns 21 arranged alongside and extend in the same direction to form the fiber structure 20 as the fiber body. In the following description, the fiber body including the first reinforcing fiber yarns 31 and the second reinforcing fiber yarns 21 fed from the feeding device 41 serves as the fiber structure 20. In FIG. 5, the pultrusion molding equipment 40 and the fiber structure 20 are schematically illustrated.

As illustrated in FIG. 2, the fiber structure 20 has a gap between any two first reinforcing fiber yarns 31 adjacent in the first direction X, in the second direction Y, or in another direction. A gap is also formed between any two second reinforcing fiber yarns 21 adjacent in the first direction X, in the second direction Y, or in another direction. Furthermore, a gap is formed between the second reinforcing fiber yarn 21 and the first reinforcing fiber yarn 31 adjacent in the first direction X, in the second direction Y, or in another direction.

As illustrated in FIG. 5, the matrix resin 12 in a liquid state is stored in the impregnation bath 42. The matrix resin 12 stored in the impregnation bath 42 is high-temperature molten resin. In the impregnation bath 42, the matrix resin 12 permeates the fiber structure 20 fed from the feeding device 41. The fiber structure 20 continuously passes through the impregnation bath 42 in the extending direction of the fiber body including the first reinforcing fiber yarns 31 and the second reinforcing fiber yarns 21.

The first reinforcing fiber yarns 31 and the second reinforcing fiber yarns 21 of the fiber structure 20 are impregnated with the matrix resin 12, so that the whole fiber structure 20 is impregnated with the matrix resin 12. In the fiber structure 20, the matrix resin 12 enters the gap between the adjacent second reinforcing fiber yarns 21, the gap between the adjacent first reinforcing fiber yarns 31, and the gap between the first reinforcing fiber yarn 31 and the second reinforcing fiber yarn 21 adjacent to each other. The whole surface of the fiber structure 20 is coated by the matrix resin 12. That is, the gaps in the fiber structure 20 are filled with the matrix resin 12.

As illustrated in FIG. 5, the fiber structure 20 impregnated with the matrix resin 12 is expressed by the press 43. Accordingly, the whole fiber structure 20 is pressed in the second direction Y, so that the first reinforcing fiber yarns 31 and the second reinforcing fiber yarns 21 are pressed in the second direction Y. The expression of the fiber structure 20 by the press 43 removes excess matrix resin 12 from the fiber structure 20.

Pressing the fiber structure 20 causes each second reinforcing fiber yarn 21 of the fiber structure 20 to become deformed such that a gap between the adjacent continuous fibers 22 increases. This loosens the bunched continuous fibers 22 of the second reinforcing fiber yarn 21.

Accordingly, as illustrated in FIG. 1, the continuous fibers 22 are dispersed into the matrix resin 12 between the adjacent first reinforcing fiber yarns 31. In such a way, the fiber-reinforced composite material 10 is produced.

As illustrated in FIG. 5, the heating die 44 heats the fiber structure 20 impregnated with the matrix resin 12, i.e., the fiber-reinforced composite material 10. That is, the matrix resin 12 in the fiber-reinforced composite material 10 is thermally cured by the heating die 44. The fiber-reinforced composite material 10 is then pulled by the puller 45, and cut by the cutter 46 to a desired length.

Operation of First Embodiment

As illustrated in FIG. 1, in the fiber-reinforced composite material 10, the pressed first reinforcing fiber yarn 31 has a slightly flattened shape, but the discontinuous fibers 32 are maintained in bundle form by the covering yarn 33. The discontinuous fibers 32 of the pressed first reinforcing fiber yarn 31 are slightly deformed, but still extend almost linearly. Accordingly, the first reinforcing fiber yarn 31 enhances the strength of the fiber-reinforced composite material 10.

The continuous fibers 22 of the second reinforcing fiber yarn 21 are not bundled by the covering yarn 33 unlike the discontinuous fibers 32 of the first reinforcing fiber yarn 31. Accordingly, the pressed second reinforcing fiber yarn 21 becomes significantly deformed. Pressing the second reinforcing fiber yarn 21 causes the continuous fibers 22 of the second reinforcing fiber yarn 21 to move randomly so as to increase a gap between the continuous fibers 22. Accordingly, the bunched continuous fibers 22 of the second reinforcing fiber yarn 21 more loosen as compared with the bunched continuous fibers 22 before pressing. In the fiber-reinforced composite material 10, the first reinforcing fiber yarns 31 are adjacent to each other not only in the first direction X and the second direction Y, but also in various directions, such as a direction perpendicular to both the first direction X and the second direction Y. The continuous fibers 22 of the second reinforcing fiber yarns 21 are dispersed in the gaps between the adjacent first reinforcing fiber yarns 31 in the various directions.

The matrix resin 12 enters the gaps between the adjacent first reinforcing fiber yarns 31. The continuous fibers 22 of the second reinforcing fiber yarns 21 are dispersed in the gaps between the adjacent first reinforcing fiber yarns 31 in the various directions, as previously described. Accordingly, the continuous fibers 22 of the second reinforcing fiber yarns 21 are dispersed in the matrix resin 12 between the first reinforcing fiber yarns 31. This suppresses the generation of a resin-rich portion formed of the matrix resin 12 only.

The dispersed continuous fibers 22 extend almost linearly. Accordingly, the continuous fibers 22 enhance the strength of the fiber-reinforced composite material 10.

The first embodiment achieves the following effects.

(1-1) In the manufacturing process of the fiber-reinforced composite material 10, the fiber structure 20 impregnated with the matrix resin 12 is pressed by the press 43. The continuous fibers 22 are dispersed in the gaps between the first reinforcing fiber yarns 31. Accordingly, the continuous fibers 22 are dispersed in the matrix resin 12 filled in the gaps between the first reinforcing fiber yarns 31 in the fiber-reinforced composite material 10 including the fiber structure 20 as the reinforcement. This configuration suppresses the generation of a resin-rich portion between the first reinforcing fiber yarns 31 in the fiber-reinforced composite material 10 including the fiber structure 20 as the reinforcement.

(1-2) In the fiber-reinforced composite material 10, the first reinforcing fiber yarns 31 include the untwisted discontinuous fibers 32, which are easily arranged in the same fiber orientation so as to enhance the strength of the fiber-reinforced composite material 10. The discontinuous fibers 32 are regenerated carbon fibers, such as tow or thrum produced when multiaxial fabrics or woven fabric are trimmed. The discontinuous fibers 32 need to be bundled for reuse of the regenerated carbon fibers, i.e., the discontinuous fibers 32, as a yarn. Accordingly, each of the first reinforcing fiber yarns 31 including such discontinuous fibers 32 needs the covering yarn 33. Even when the first reinforcing fiber yarn 31 is pressed, the first reinforcing fiber yarn 31 wrapped with the covering yarn 33 becomes only slightly deformed, so that the discontinuous fibers 32 do not loosen. However, in the fiber structure 20 including such first reinforcing fiber yarns 31, easy loosening of the second reinforcing fiber yarn 21 suppresses the generation of a resin-rich portion between the first reinforcing fiber yarns 31.

(1-3) The fiber structure 20 is a unidirectional fabric. In the manufacturing process of the fiber-reinforced composite material 10, the first reinforcing fiber yarns 31 and the second reinforcing fiber yarns 21 are likely to become misaligned when the fiber structure 20 is pressed by the press 43. Since the fiber structure 20 is the unidirectional fabric, each of the second reinforcing fiber yarns 21 is likely to be placed between the first reinforcing fiber yarns 31. This facilitates the dispersion of the continuous fibers 22 of the second reinforcing fiber yarns 21 between the first reinforcing fiber yarns 31 when the fiber structure 20 is pressed. Therefore, the fiber structure 20 formed of a unidirectional fabric is more likely to suppress the generation of a resin-rich portion between the first reinforcing fiber yarns 31.

Second Embodiment

Figure 6:
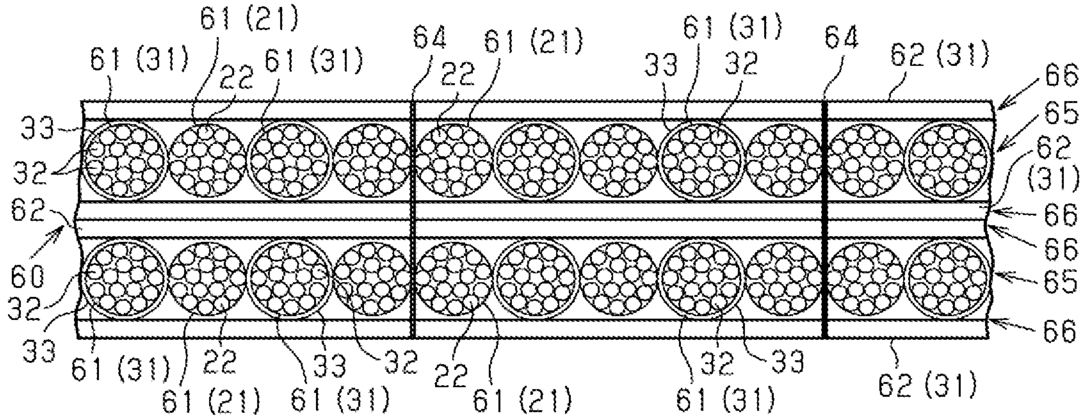
FIG. 6 is a schematic cross-sectional view of a fiber structure according to a second embodiment.
Figure 7:
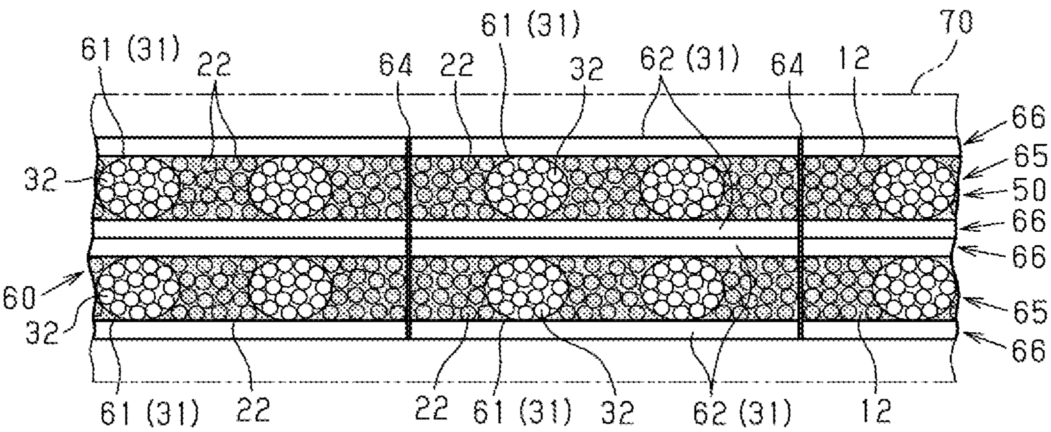
FIG. 7 is a schematic cross-sectional view of a fiber-reinforced composite material according to the second embodiment.

The following will describe a fiber structure and a fiber-reinforced composite material according to a second embodiment with reference to accompanying FIGS. 6 and 7. In the following description about the second embodiment, detailed explanation about elements similar to the first embodiment is not elaborated.

As illustrated in FIG. 6, a fiber-reinforced composite material 50 includes a fiber structure 60. The fiber structure 60 is a plurality of fabrics each including a warp layer 65 and a plurality of weft layers 66. The warp layer 65 includes a plurality of warp yarns 61, and the weft layers 66 each include a plurality of weft yarns 62.

Specifically, the fiber structure 60 is formed of two fabrics laminated with threads 64 in a laminating direction. Each of the two fabrics includes a single warp layer 65 and two weft layers 66. The warp layer 65 is held between the weft layers 66.

The warp layer 65 is formed of the warp yarns 61 arranged such that the warp yarns 61 extend in the same direction. The weft layers 66 are each formed of the weft yarns 62 arranged such that the weft yarns 62 extend in the same direction. The extending direction of the warp yarns 61 intersects the extending direction of the weft yarns 62.

Each of the warp yarns 61 includes the first reinforcing fiber yarns 31 and the second reinforcing fiber yarns 21. The warp layer 65 has a plurality of portions in which two second reinforcing fiber yarns 21 are held between and by the first reinforcing fiber yarns 31 and a plurality of portions in which a single second reinforcing fiber yarn 21 is held between and by the first reinforcing fiber yarns 31. In the warp layer 65, the arrangement of the second reinforcing fiber yarns 21 and the first reinforcing fiber yarns 31 may be modified as necessary. For example, the first reinforcing fiber yarns 31 and the second reinforcing fiber yarns 21 may be arranged alternately. In the fiber structure 60 according to the present embodiment, the warp layers 65 include the first reinforcing fiber yarns 31 and the second reinforcing fiber yarns 21 as the warp yarns 61, and serve as the fiber body of the present disclosure. Accordingly, the fiber structure 60 includes the fiber body of the present disclosure.

The weft layers 66 include the first reinforcing fiber yarns 31 only. The weft layers 66 are each formed of the weft yarns 62 arranged such that the weft yarns 62 extend in the same direction. The threads 64 may be any threads. The threads 64 extend in the laminating direction of the warp layers 65 and the weft layers 66 and are folded back at the outermost weft layer 66 of the fiber structure 60.

In the warp layers 65, the warp yarns 61 are slightly separated from each other by the threads 64 at locations where the threads 64 extend in the laminating direction. In the warp layers 65, each of the threads 64 extending in the laminating direction is disposed between the adjacent second reinforcing fiber yarns 21. In other words, the adjacent second reinforcing fiber yarns 21 are separated from each other by the corresponding thread 64.

The fiber-reinforced composite material 50 is formed by the Resin Transfer Molding (RTM) method.

As illustrated in FIG. 7, the fiber structure 60 is placed in a molding die 70, and the molding die 70 is filled with the matrix resin 12 to produce the fiber-reinforced composite material 50. The fiber structure 60 is pressed by a fill pressure of the matrix resin 12 in the molding die 70. The fiber structure 60 is impregnated with the matrix resin 12 in the molding die 70.

The matrix resin 12 permeates the first reinforcing fiber yarns 31 and the second reinforcing fiber yarns 21 of the warp layers 65 and the weft layers 66 of the fiber structure 60, thereby permeating the whole fiber structure 60. In the warp layers 65, the matrix resin 12 enters the gap between the second reinforcing fiber yarns 21 adjacent to each other and the gap between the second reinforcing fiber yarn 21 and the first reinforcing fiber yarn 31 adjacent to each other. Furthermore, in the weft layers 66, the matrix resin 12 enters a gap between the weft yarns 62 adjacent to each other. When the matrix resin 12 and the fiber structure 60 are heated in the molding die 70, the matrix resin 12 is cured and integrated with the fiber structure 60. This produces the fiber-reinforced composite material 50 that includes the matrix resin 12 as a matrix and the fiber structure 60 as a reinforcement.

Operation of Second Embodiment

In the warp layers 65 of the fiber structure 60 of the fiber-reinforced composite material 50, each of the first reinforcing fiber yarns 31 pressed by the fill pressure of the matrix resin 12 has a slightly flattened shape, but the discontinuous fibers 32 are maintained in bundle form by the covering yarn 33. The discontinuous fibers 32 of the first reinforcing fiber yarn 31 pressed by the fill pressure are slightly deformed, but still extend almost linearly. Accordingly, the first reinforcing fiber yarn 31 enhances the strength of the fiber-reinforced composite material 50.

In each warp layer 65, the continuous fibers 22 of the second reinforcing fiber yarn 21 are not bundled by the covering yarn 33 unlike the discontinuous fibers 32 of the first reinforcing fiber yarn 31. Accordingly, the second reinforcing fiber yarn 21 becomes significantly deformed by the fill pressure. The fill pressure causes the continuous fibers 22 of the second reinforcing fiber yarn 21 to move randomly so as to increase a gap between the continuous fibers 22. Accordingly, the bunched continuous fibers 22 of the second reinforcing fiber yarn 21 more loosen as compared with the bunched continuous fibers 22 before the filling of the matrix resin 12. The continuous fibers 22 of the second reinforcing fiber yarn 21 are dispersed between the adjacent first reinforcing fiber yarns 31 in the warp layer 65.

The matrix resin 12 enters each gap formed between the adjacent first reinforcing fiber yarns 31 in the warp layer 65. The continuous fibers 22 of the second reinforcing fiber yarns 21 are dispersed in the gaps between the adjacent first reinforcing fiber yarns 31, as previously described. Accordingly, the continuous fibers 22 of the second reinforcing fiber yarns 21 are dispersed in the matrix resin 12 between the first reinforcing fiber yarns 31. This suppresses the generation of a resin-rich portion formed of the matrix resin 12 only in the warp layer 65.

The second embodiment achieves the following effects.

(2-1) In the manufacturing process of the fiber-reinforced composite material 50 by RTM method, the fiber structure 60 impregnated with the matrix resin 12 is pressed by the fill pressure of the matrix resin 12. The continuous fibers 22 are dispersed in the gaps between the first reinforcing fiber yarns 31 in the warp layer 65. Accordingly, the continuous fibers 22 are dispersed in the matrix resin 12 filled in the gaps between the first reinforcing fiber yarns 31 in the fiber-reinforced composite material 50 including the fiber structure 60 as the reinforcement. This configuration suppresses the generation of a resin-rich portion between the first reinforcing fiber yarns 31 in the fiber-reinforced composite material 50.

(2-2) The fiber structure 60 is fabrics including the warp layers 65 and the weft layers 66. The warp layers 65 include the first reinforcing fiber yarns 31 and the second reinforcing fiber yarns 21. This configuration suppresses the generation of a resin-rich portion, which is formed of the matrix resin 12 only, between the first reinforcing fiber yarns 31 in the warp layers 65. This configuration therefore suppresses a decrease in the strength of the fiber-reinforced composite material 50, which includes the fabrics as the reinforcement formed of the warp yarns 61 and the weft yarns 62, at the resin-rich portion.

The fiber structure and the fiber-reinforced composite material according to the embodiments may be modified as described below. The embodiments may be combined with the following modifications within technically consistent range.

In the fiber structure 60 according to the second embodiment, not only the warp layers 65 but also the weft layers 66 may serve as the fiber body formed 5 of the first reinforcing fiber yarns 31 and the second reinforcing fiber yarns 21.

In the fiber structure 60 according to the second embodiment, the weft layers 66 may serve as the fiber body formed of the first reinforcing fiber yarns 31 and the second reinforcing fiber yarns 21, and the warp layers 65 may be formed of the first reinforcing fiber yarns 31 only.

The bundle of the discontinuous fibers 32 of each first reinforcing fiber yarn 31 may be twisted. The twisted discontinuous fibers 32 cooperate with the covering yarn 33 to suppress the loosening of the first reinforcing fiber yarn 31.

In the first embodiment, the fiber-reinforced composite material 10 may be formed of a lamination of the unidirectional fabric and unidirectional prepreg sheets. In this configuration, the unidirectional fabric is formed of the first reinforcing fiber yarns 31 and the second reinforcing fiber yarns 21 arranged in the same direction, and the unidirectional prepreg sheets are impregnated with the matrix resin 12.

The covering yarn 33 wrapped around the first reinforcing fiber yarn 31 may be formed of reinforcing fibers other than organic fibers. The material of the covering yarn 33 may be carbon fibers, aramid fibers, or glass fibers, for example.

The first reinforcing fiber yarn 31 may be formed of a bundle of fibers including the discontinuous fibers 32 and the continuous fibers wrapped with the covering yarn 33.

The discontinuous fibers 32 of the first reinforcing fiber yarn 31 do not have to be regenerated carbon fibers, but may be unused carbon fibers or new carbon fibers.

In the second embodiment, the type of fabric for the fiber structure 60 may be changed as necessary.

What is claimed is:

1. A fiber structure serving as a reinforcement of a fiber-reinforced composite material that includes matrix resin as a matrix, the fiber structure comprising:

a plurality of first reinforcing fiber yarns each formed of a bundle of fibers including discontinuous fibers made of reinforcing fibers, the bundle of fibers being wrapped with a covering yarn; and a second reinforcing fiber yarn formed of a bunch of continuous fibers made of reinforcing fibers, wherein the fiber structure includes a fiber body formed of the first reinforcing fiber yarns and the second reinforcing fiber yarn arranged alongside and extending in the same direction, the fiber body having a portion in which the second reinforcing fiber yarn is held between and by the first reinforcing fiber yarns.

2. The fiber structure according to claim 1, wherein the fiber structure is a unidirectional fabric, wherein the whole fiber structure serves as the fiber body.

3. The fiber structure according to claim 1, wherein the fiber structure is a fabric including a warp layer and a weft layer, wherein the warp layer and the weft layer include a plurality of warp yarns and a plurality of weft yarns, respectively, and the warp layer includes the first reinforcing fiber yarns and the second reinforcing fiber yarn as the warp yarns, and serves as the fiber body.

4. A fiber-reinforced composite material comprising:

matrix resin as a matrix; and a fiber structure as a reinforcement, wherein the fiber structure includes:

a plurality of first reinforcing fiber yarns each formed of a bundle of fibers including discontinuous fibers made of reinforcing fibers, the bundle of fibers being wrapped with a covering yarn;

a second reinforcing fiber yarn formed of a bunch of continuous fibers made of reinforcing fibers; and a fiber body formed of the first reinforcing fiber yarns and the second reinforcing fiber yarn arranged alongside and extending in the same direction, the fiber body having a portion in which the second reinforcing fiber yarn is held between and by the first reinforcing fiber yarns, and the continuous fibers are dispersed in the matrix resin filled in a gap between the first reinforcing fiber yarns.

* * * * *